US006761152B1

(12) United States Patent
Elmslie et al.

(10) Patent No.: US 6,761,152 B1
(45) Date of Patent: Jul. 13, 2004

(54) ENGINE WITH INJECTOR FUEL CONTROL SYSTEM AND METHOD

(75) Inventors: James C. Elmslie, Oxford, MI (US); Gary J. Patterson, Utica, MI (US)

(73) Assignee: General Motors Corporation, Detroit, MI (US)

( * ) Notice: Subject to any disclaimer, the term of this patent is extended or adjusted under 35 U.S.C. 154(b) by 34 days.

(21) Appl. No.: 10/268,831

(22) Filed: Oct. 10, 2002

(51) Int. Cl.[7] .............................................. F02M 41/00
(52) U.S. Cl. ...................................... 123/463; 123/457
(58) Field of Search ................................. 123/456, 447, 123/457, 458, 511, 514, 515, 463

(56) References Cited

U.S. PATENT DOCUMENTS

| | | | | |
|---|---|---|---|---|
| 5,327,872 A | * | 7/1994 | Morikawa | 123/516 |
| 5,598,817 A | * | 2/1997 | Igarashi et al. | 123/179.17 |
| 5,778,857 A | * | 7/1998 | Nakamura et al. | 123/406.37 |
| 6,021,763 A | * | 2/2000 | Yoshihara et al. | 123/516 |
| 6,142,120 A | * | 11/2000 | Biester et al. | 123/456 |

* cited by examiner

Primary Examiner—Mahmoud Gimie
(74) Attorney, Agent, or Firm—Leslie C. Hodges

(57) ABSTRACT

A method for extending the operating range of engine fuel injectors fed by a pressurized fuel system includes operating the fuel system at a controlled lower fuel pressure during engine operation in a lower power range, and operating the fuel system at a controlled higher fuel pressure during engine operation above the lower power range. An engine embodying the method may include a fuel distributor connected with the injectors for supplying the pressurized fuel and a pressure control operative in response to a prescribed engine condition, such as supercharger boost pressure, to maintain injector fuel supply pressure at a lower value during engine operation in a lower portion of the power range and at a higher value during engine operation in a higher portion of the power range. The dual or multiple fuel pressures provide greater fuel output for increased power in the higher power range with consistent fuel delivery for stable idle and engine operation in the lower power range.

9 Claims, 1 Drawing Sheet

ENGINE WITH INJECTOR FUEL CONTROL SYSTEM AND METHOD

TECHNICAL FIELD

This invention relates to control of engine fuel injectors and more particularly to a system and method for extending the operating range of the injectors.

BACKGROUND OF THE INVENTION

It is well known in the engine art to supply fuel to engine cylinders or intake ports through fuel injectors that are fed with pressurized fuel at a constant pressure or pressure differential and have electrically controlled injection valves. The amount of fuel injected into the cylinders at each cycle is controlled by pulse width modulation of the electric valve control to vary the time the valve is open in accordance with the amount of fuel to be injected. As engine power outputs for automotive engines are increased, such as by supercharging or turbocharging, larger injectors may be required in order to provide the necessary amount of fuel for full power operation of the engine. In such cases, to operate the engine with the larger injectors at idle, the pulse width or injection time is reduced to the point where obtaining consistent fuel delivery from the injectors may become difficult. As a result, engine idle may be erratic or unstable. A system and method for extending the operating range of the fuel injectors is accordingly desired.

SUMMARY OF THE INVENTION

The present invention extends the operating range of fuel injectors fed by a pressurized fuel system of an engine by providing for operation of the fuel system at two or more different fuel pressure levels. For operating the injectors in a predetermined lower operating range, the fuel is controlled at a lower pressure, and when operating the system above the lower operating range, the fuel is controlled at a higher pressure. One or more intermediate ranges could be provided if desired. The higher pressure allows for additional fuel to be injected into the cylinders in order to provide increased output while operating within pulse width timing settings. When the desired engine output power is reduced, the system operates at a controlled lower fuel pressure. Thus, at higher loads for either naturally aspirated or supercharged (boosted) engines, additional fuel can be delivered by the injectors within their stable operating ranges. At lower loads and at idle, the lower fuel pressure allows the injectors to deliver smaller accurate fuel increments so that stable operation of the engine can be maintained within the operating range of the injectors The invention is applicable to engines in general, including naturally-aspirated engines, but is particularly suitable for engines with power capabilities extended by supercharging, including turbocharging, wherein the output capability of engine cylinders is increased. In such cases, an increase in the size of the injectors may be minimized or even avoided by the use of the increased fuel pressure level for high power operation of the engine under turbocharged or supercharged conditions, and stable operation of the engine idle condition is easily accommodated while operating at the lower fuel pressure.

In a turbocharged engine, for example using two fuel pressure settings, the fuel pressure may be controlled by a three-way valve. In the lower power-operating range of the engine, the valve directs fuel to a low fuel pressure regulator, which returns excess fuel to the engine fuel tank. In the higher engine power-operating range, the valve is actuated to direct fuel to a high fuel pressure regulator and close off flow through the low pressure regulator so that the fuel pressure is increased to provide increased fuel injection from the injectors.

As an alternative, the fuel pressure can be controlled by a single valve at the inlet or outlet of the low pressure regulator. The valve is open to allow flow through the low pressure regulator which then controls the fuel pressure at a lower pressure level. To obtain a higher pressure, the valve is closed to block flow through the low pressure regulator, thus directing all the fuel flow through the high pressure regulator, which maintains fuel pressure at the desired higher level.

Control of the fuel pressure selection valve or device may be by any suitable means. In an automotive engine, an electronic control unit (ECU) or engine control module (ECM) may be used to initiate the valve setting although a suitable passive system might alternatively be applied, depending upon the engine control system capabilities If desired, any other suitable control system for varying the fuel pressure may be utilized. Such alternatives would include a single pressure regulator with a variable pressure control actuated by any suitable electronic or pressure responsive means.

These and other features and advantages of the invention will be more fully understood from the following description of certain specific embodiments of the invention taken together with the accompanying drawings.

DESCRIPTION OF THE PREFERRED EMBODIMENT

Figure 1:
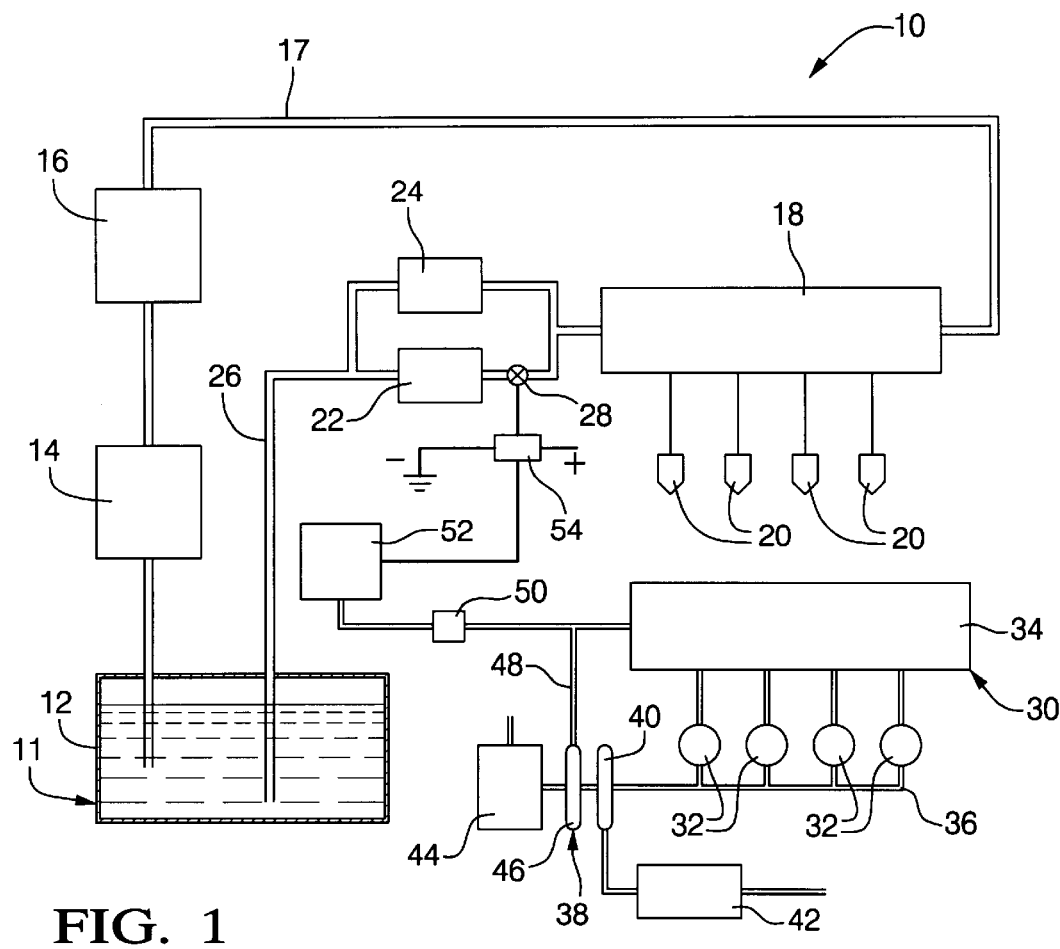
FIG. 1 is a diagram showing pertinent portions of the fuel and air systems of an engine illustrating a first embodiment of the invention and operable in accordance with the method of the invention.

Referring first to FIG. 1 of the drawings, numeral 10 generally indicates an engine having an injector fuel pressure control system according to the invention. The engine has a fuel system 11 including a fuel tank 12, a fuel pump 14 and a fuel filter 16 connected in series with a pressure line 17 that delivers fuel to a fuel rail 18, which acts as a fuel distributor. The fuel rail 18 feeds four injectors 20 for delivering fuel to the engine cylinders or intake ports. The fuel rail is also connected with a low pressure regulator 22 and a high pressure regulator 24 connected in parallel, each regulator having a bypass outlet which delivers fuel to a fuel return line 26 leading to the fuel tank 12. A solenoid valve 28 is disposed at the inlet of the low pressure regulator 22. The valve is normally open but is closable to cut off fuel flow to the low pressure regulator, thereby allowing the high pressure regulator 24 to control the fuel pressure.

The engine has an intake air system 30 which includes the engine cylinders 32 into which the injectors 20 are positioned to deliver fuel. Air is delivered to the cylinders from an intake manifold 34 through conventional intake runners which feed the cylinder intake ports, not shown, into which the injected fuel may be delivered. Exhaust products from the cylinders are delivered to an exhaust manifold 36. The engine is provided with a turbocharger 38 including a turbine 40 to which exhaust gases are delivered from the manifold 36. The outlet of the turbine is connected with the usual exhaust treatment device or engine muffler 42. Intake air to the engine air system is directed through an intake air filter 44 to the turbocharger compressor 46. From the compressor, the air passes through an air intake line 48 to the engine intake manifold 34.

The intake air pressure is measured by a pressure sensor 50 that connects with line 48 and the sensed pressure is transmitted to an engine control 52. The engine control in turn operates a valve actuator 54 to close valve 28 whenever the pressure in the intake line 48 and manifold 34 reaches a predetermined level. If desired, the valve 28 could be provided with a pressure-responsive actuator that could utilize boost pressure in the intake manifold or differential pressures in the intake system to close the valve whenever a desired pressure level is reached In operation of the system of FIG. 1, the solenoid valve actuator 54 is de-energized during engine starting and normal operation up to a predetermined power output level. In the indicated arrangement, an increased power output is indicated by the boost pressure in the intake manifold 34 rising to a predetermined level. This occurs when the turbocharger energy is sufficient to increase the manifold pressure and allow increased fuel input to the engine beyond that which would occur without the presence of the turbocharger.

When the boost pressure rises to the predetermined level, the solenoid actuator 52 is energized to close valve 28, cutting off the flow of fuel through the low pressure regulator 22. The high pressure regulator 24 then permits the fuel pressure in the fuel rail 18 to increase until the set pressure of the regulator is reached and excess fuel is again delivered through the fuel return line 26 to the fuel tank. With the changing of the fuel pressure, the engine control 52 adjusts the pulse width control for the injectors to maintain the desired engine output at the new pressure level. The higher pressure causes the injectors to inject a greater amount of fuel for a pulse width of a similar time period so that, at any specified control pulse width, the amount of fuel injected by each injector is increased and the engine output is thereby increased.

When the engine power is again reduced and the manifold pressure falls below ambient, the solenoid control 54 is de-energized, opening valve 28 and again allowing fuel flow through the low pressure regulator 22. This causes fuel pressure to return to the lower controlled pressure level. That allows the engine speed to be reduced to idle or the engine to operate at intermediate speed and load conditions within the range of the injectors when operated at the lower pressure level. The idle condition of the engine is thus made more stable and the operational conditions of the injectors are improved for lower load operations.

Figure 2:
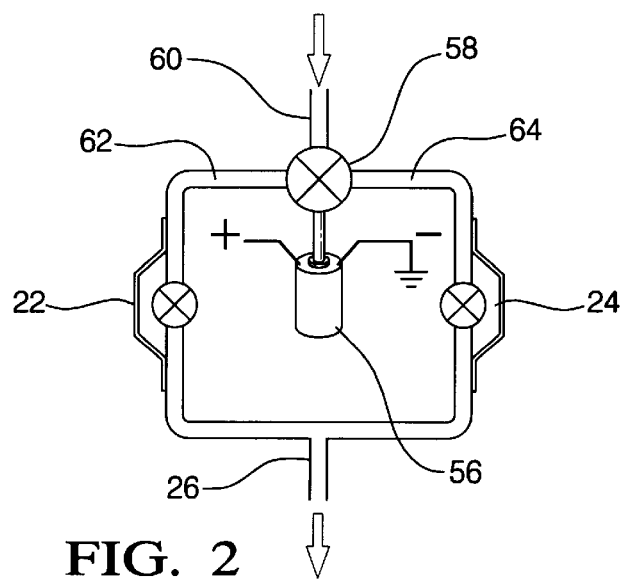
FIG. 2 is a diagram of a pressure regulating portion of an alternative embodiment utilizing a three-way valve to control fuel flow to the regulators.

FIG. 2 of the drawings illustrates an alternative control valve arrangement wherein a solenoid actuator 56 controls a three-way valve 58 located at the juncture of a connecting line 60 from the fuel rail 18 with parallel lines 62, 64 to the low and high pressure regulators 22, 24. The bleed ports of the regulators again connect with the fuel return line 26.

Operation of this embodiment is basically the same as previously described except that valve 58, when in the un-energized condition, directs fuel to the low pressure regulator 22 while at the same time cutting off fuel flow to the high pressure regulator 24. When the solenoid actuator 56 is energized, the three-way valve 58 is actuated to direct fuel to the high pressure regulator 24 and cut off fuel to the low pressure regulator 22. The result is the same as previously described in that, when the boost pressure is sufficiently high, valve 58 directs fuel pressure to the high pressure regulator which raises the pressure in the fuel rail 18 to the setting of the regulator 24 for operation of the engine at high loads made possible by the turbocharger or supercharger boost pressure. At lower operating manifold pressures, the solenoid 56 is de-energized so that fuel is directed to the low pressure regulator and the fuel pressure is regulated at the setting of that regulator for low power and idle operation.

Obviously, other arrangements for connecting the regulators or the utilization of a single regulator with variable pressure control, as well as appropriate means for controlling flow in any suitable manner, could be applied to operate the engine in accordance with the broader scope of the invention as defined by the claims.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An internal combustion engine having a fuel system including a plurality of fuel injectors adapted to be supplied with pressurized fuel for injection to associated cylinders upon opening of individual injection valves, the engine being operable over a range of power output, the engine comprising:

a fuel distributor connected with the injectors for supplying the pressurized fuel;

a first pressure regulator connected to the fuel distributor and operative to control a maximum injector fuel supply pressure at a predetermined lower value during engine operation in a lower portion of said range;

a second pressure regulator connected to the fuel distributor and operative to control a maximum injector fuel supply pressure at a predetermined higher value during operation of the engine in a higher portion of said range; and a control valve connected with the first regulator and operative to close to cut off fuel flow through the first regulator during engine operation in the higher range of power output;

whereby the first pressure regulator controls the fuel pressure at the lower value when the valve is open, and the second pressure regulator controls the fuel pressure at the higher value when the valve is closed and fuel to the first regulator is cut off.

2. An engine as in claim 1 including:

a supercharger for raising the charge air pressure delivered to the cylinders to permit engine operation in the higher range; and an actuator operative to close the control valve in response to a cylinder charge air pressure above a prescribed value.

3. An engine as in claim 2 wherein the supercharger is an exhaust-driven turbocharger.

4. An internal combustion engine having a fuel system including a plurality of fuel injectors adapted to be supplied with pressurized fuel for injection to associated cylinders upon opening of individual injection valves, the engine being operable over a range of power output, the engine comprising:

a fuel distributor connected with the injectors for supplying the pressurized fuel; and a pressure control operative in response to a prescribed engine condition to maintain injector fuel supply pressure at a lower value during engine operation in a lower portion of the range and at a higher value during engine operation in a higher portion of the range.

5. An engine as in claim 4 wherein the prescribed engine condition is a function of the cylinder charge air pressure.

6. An engine as in claim 4 wherein the engine is provided with a supercharger and the pressure control is operative to provide the higher value when the supercharger is operating to deliver a boost pressure.

7. A method for extending the operating range of fuel injectors fed by a pressurized fuel system of an engine, the method comprising:

operating the system at a controlled lower fuel pressure during engine operation in a predetermined lower power operating range; and operating the system at a controlled higher fuel pressure during engine operation above the lower power operating range.

8. A method as in claim 7 including:

determining the power range of engine operation as a function of the engine cylinder intake air pressure; and operating the system at the controlled higher fuel pressure when the intake air pressure exceeds a prescribed value.

9. A method as in claim 8 including determining the intake air pressure by sensing the boost pressure of an associated engine supercharger.

* * * * *